US010641971B2

United States Patent
Kamada et al.

(10) Patent No.: US 10,641,971 B2
(45) Date of Patent: May 5, 2020

(54) OPTICAL CONNECTOR

(71) Applicant: SEI Optifrontier Co., Ltd., Yokohama-shi, Kanagawa (JP)

(72) Inventors: Tsutomu Kamada, Yokohama (JP); Kenichiro Ohtsuka, Yokohama (JP); Motoyoshi Kimura, Komaki (JP)

(73) Assignee: SEI OPTIFRONTIER CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 16/083,565

(22) PCT Filed: Mar. 9, 2017

(86) PCT No.: PCT/JP2017/009575
§ 371 (c)(1),
(2) Date: Sep. 10, 2018

(87) PCT Pub. No.: WO2017/155061
PCT Pub. Date: Sep. 14, 2017

(65) Prior Publication Data
US 2019/0079250 A1 Mar. 14, 2019

(30) Foreign Application Priority Data
Mar. 11, 2016 (JP) ................................. 2016-048297

(51) Int. Cl.
*G02B 6/38* (2006.01)
(52) U.S. Cl.
CPC ......... *G02B 6/3873* (2013.01); *G02B 6/3825* (2013.01); *G02B 6/3869* (2013.01); *G02B 6/3887* (2013.01); *G02B 6/3893* (2013.01)
(58) Field of Classification Search
CPC .. G02B 6/3873; G02B 6/3825; G02B 6/3869; G02B 6/3887; G02B 6/3893
See application file for complete search history.

(56) References Cited

U.S. PATENT DOCUMENTS

2017/0254961 A1  9/2017 Kamada et al.

FOREIGN PATENT DOCUMENTS

| JP | 2012-58320 A | 3/2012 | |
|---|---|---|---|
| JP | 2012058320 A * | 3/2012 | ........... G02B 6/3885 |
| WO | WO-2016/039383 A1 | 3/2016 | |

OTHER PUBLICATIONS

Tsutomu Kamada et al., "Ultra-Compact MPO Connector with Excellent Handling and Bending Strength," SEI Technical Review, Jan. 2016, pp. 104-107, No. 188, including partial English translation.

* cited by examiner

*Primary Examiner* — Peter Radkowski
(74) *Attorney, Agent, or Firm* — Faegre Drinker Biddle & Reath LLP

(57) ABSTRACT

An optical connector comprises: an inner housing including an engagement recess for engaging an optical adaptor on its surface; a boot connected to a rear side of the inner housing; a first outer housing covering the engagement recess; and a second outer housing covering a part of the first outer housing and provided freely movably in a front-rear direction relative to the first outer housing. When the second outer housing moves frontward, the engagement recess is exposed by the second outer housing and the inner housing moving relative to the first outer housing, and when the second outer housing moves rearward, the engagement recess is exposed by the second outer housing and the first outer housing moving relative to the inner housing.

2 Claims, 7 Drawing Sheets

OPTICAL CONNECTOR

TECHNICAL FIELD

An aspect of the present invention relates to an optical connector.

This application claims priority based on Japanese Patent Application No. 2016-048297, filed on Mar. 11, 2016, the content disclosed in the aforementioned Japanese application being incorporated by reference herein in its entirety.

BACKGROUND ART

In Patent Literature 1, an optical connector inserted into and pulled off from an optical connector adaptor is disclosed. This optical connector includes a connector body holding a ferrule attached to the tip of an optical fiber, a coupling movable frontward and rearward relative to the connector body, a coupling engagement member provided rearward of the connector body, a boot extending rearward from the coupling engagement member, and an operation stick extending rearward.

With this optical connector, when the operation stick is pushed frontward, the coupling engagement member and the connector body move frontward, latches of the optical connector adaptor engage with the connector body, and thereby, the optical connector is connected to the optical connector adaptor. Moreover, when the operation stick is pulled rearward, the coupling engagement member and the coupling move rearward, the above engagement of the latches is released, and thereby, the optical connector is pulled off from the optical connector adaptor.

CITATION LIST

Patent Literature

Patent Literature 1: Japanese Unexamined Patent Publication No. 2012-58320

SUMMARY OF INVENTION

An optical connector according to an aspect of the present disclosure is an optical connector connected to an optical adaptor along a predetermined connecting direction, the optical connector comprising: an inner housing including an engagement part for engaging with the optical adaptor on its surface; a boot connected to one side of the inner housing in the connecting direction; a first outer housing covering the engagement part; and a second outer housing covering at least part of the first outer housing and provided freely movably in the connecting direction relative to the first outer housing, wherein when the second outer housing moves in a direction away from the boot, the engagement part is exposed by the second outer housing and the inner housing moving relative to the first outer housing, and when the second outer housing moves in a direction toward to the boot, the engagement part is exposed by the second outer housing and the first outer housing moving relative to the inner housing.

DESCRIPTION OF EMBODIMENTS

Figure 1:
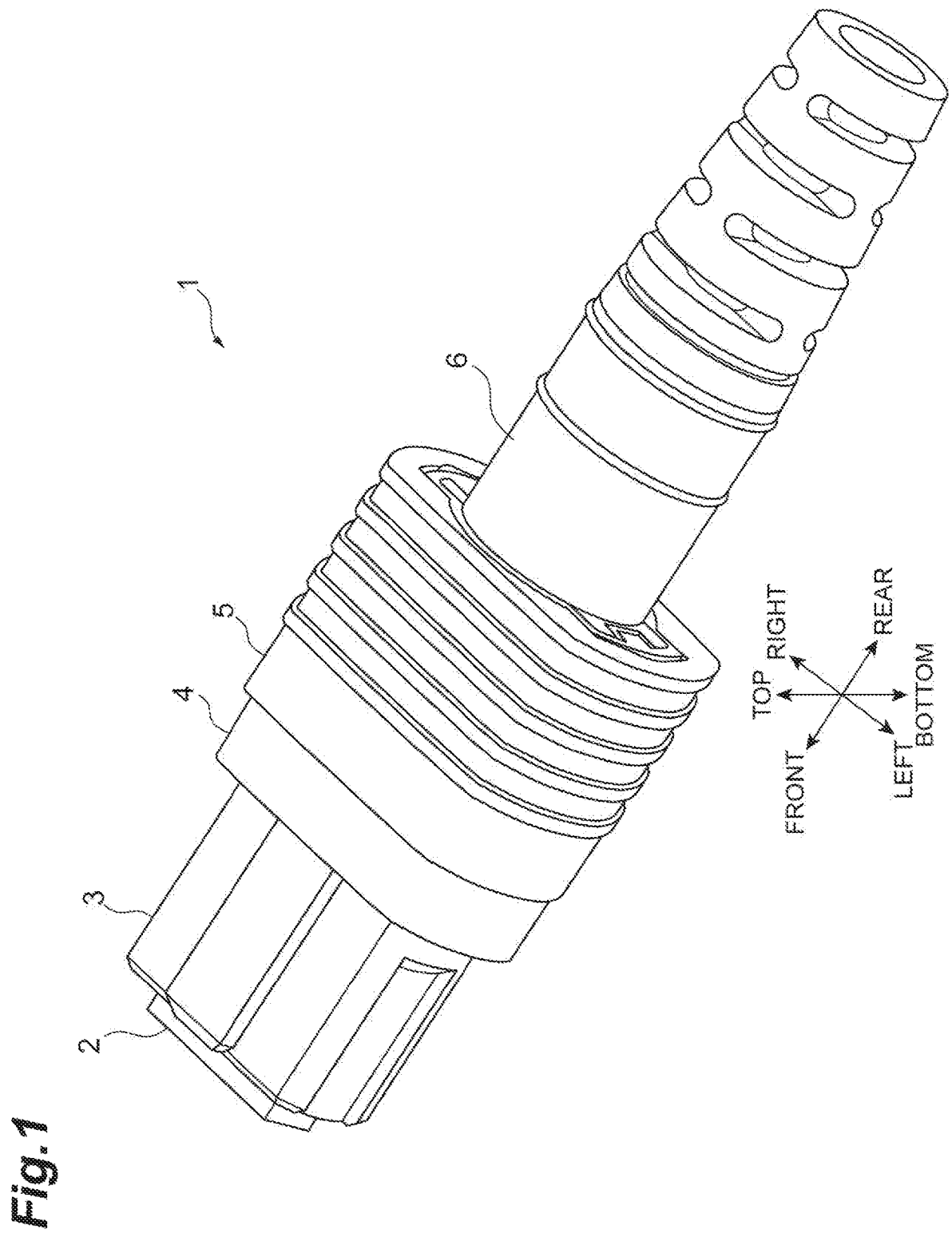
FIG. 1 is a perspective view showing an optical connector according to an embodiment.

Problems to be Solved by Present Disclosure

In a conventional optical connector, a connector body, a coupling, a coupling engagement member and a boot extend to be long in the front-rear direction. Therefore, bending stress and tensile stress exerted on the optical connector when inserting and pulling-off the optical connector and during attachment thereof tend to be large, and there can be a case where a problem such as breakage arises. In order to prevent such a problem such as breakage, an expensive material has to be used, and hence, there also arises a problem that costs of materials and the like are high.

The present disclosure is made in view of such problems, and an object thereof is to provide an optical connector capable of realizing shortening.

Effect of Present Disclosure

According to the present disclosure, shortening can be realized.

DESCRIPTION OF EMBODIMENT

First, the contents of an embodiment of the present invention are listed and described. (1) An optical connector according to an aspect of the present invention is an optical connector connected to an optical adaptor along a predetermined connecting direction, the optical connector comprising: an inner housing including an engagement part for engaging with the optical adaptor on its surface; a boot connected to one side of the inner housing in the connecting direction; a first outer housing covering the engagement part; and a second outer housing covering at least part of the first outer housing and provided freely movably in the connecting direction relative to the first outer housing, wherein when the second outer housing moves in a direction away from the boot, the engagement part is exposed by the second outer housing and the inner housing moving relative to the first outer housing, and when the second outer housing moves in a direction toward to the boot, the engagement part is exposed by the second outer housing and the first outer housing moving relative to the inner housing.

In the optical connector according to an aspect of the present invention, the second outer housing is freely movable in the connecting direction relative to the first outer housing. Further, when the second outer housing moves in the direction away from the boot, both the second outer housing and the inner housing move, the engagement part is exposed, and hence, engagement with an external optical adaptor is possible. Moreover, when the second outer housing moves in the direction toward to the boot, both the second outer housing and the first outer housing move, and the engagement part is exposed. Therefore, by releasing engagement with the optical adaptor in the engagement part, the optical connector can be detached from the optical adaptor. In this way, since attachment and detachment to/from the optical adaptor can be performed only by moving the second outer housing, operability in attachment and detachment can be improved. Moreover, the at least part of the first outer housing is covered by the second outer housing. By covering a part of the first outer housing with the second outer housing in this way, the whole length of the first outer housing and the second outer housing in the connecting direction can be reduced. Accordingly, realizing shortening of an optical connector can be achieved.

(2) In the aforementioned optical connector, one of a slit and a claw may be provided on an outer surface of the first outer housing, the other of the slit and the claw may be provided on an inner surface of the second outer housing, and the second outer housing may be freely movable relative to the first outer housing in a state where the claw engages with the slit. In this case, since the second outer housing moves in the state where the claw engages with the slit, the movement of the second outer housing can be stabilized.

Details of Embodiment

Specific examples of an optical connector according to an embodiment of the present disclosure are described with reference to the drawings. Notably, the present invention is not limited to these exemplary illustrations but defined by the claims, and is intended to include any modifications within a range of equivalency of the claims. In the following description, the same or corresponding elements in the description of the drawings are given the same signs and the duplicated description thereof is omitted.

Figure 2:
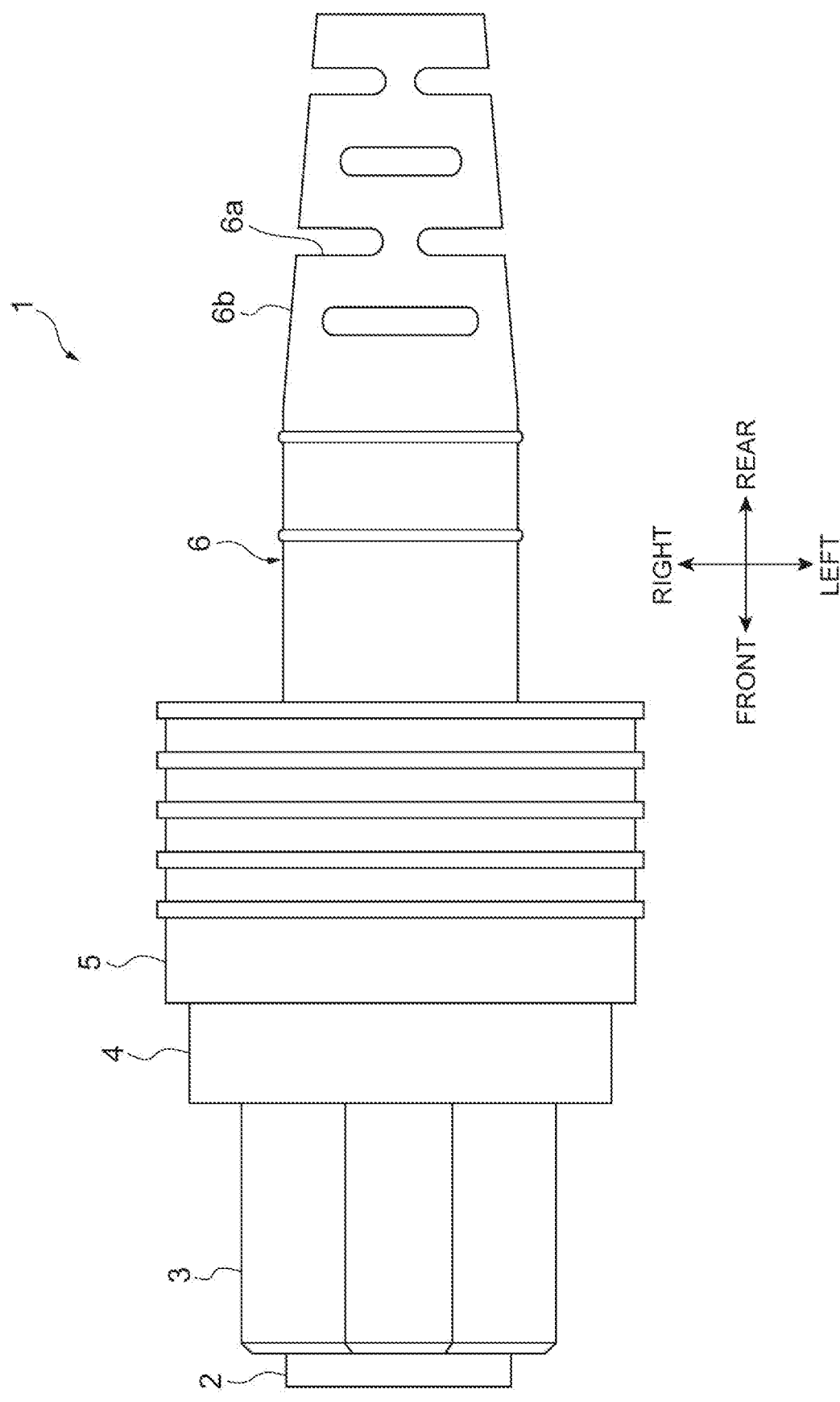
FIG. 2 is a plan view showing the optical connector in FIG. 1.
Figure 3:
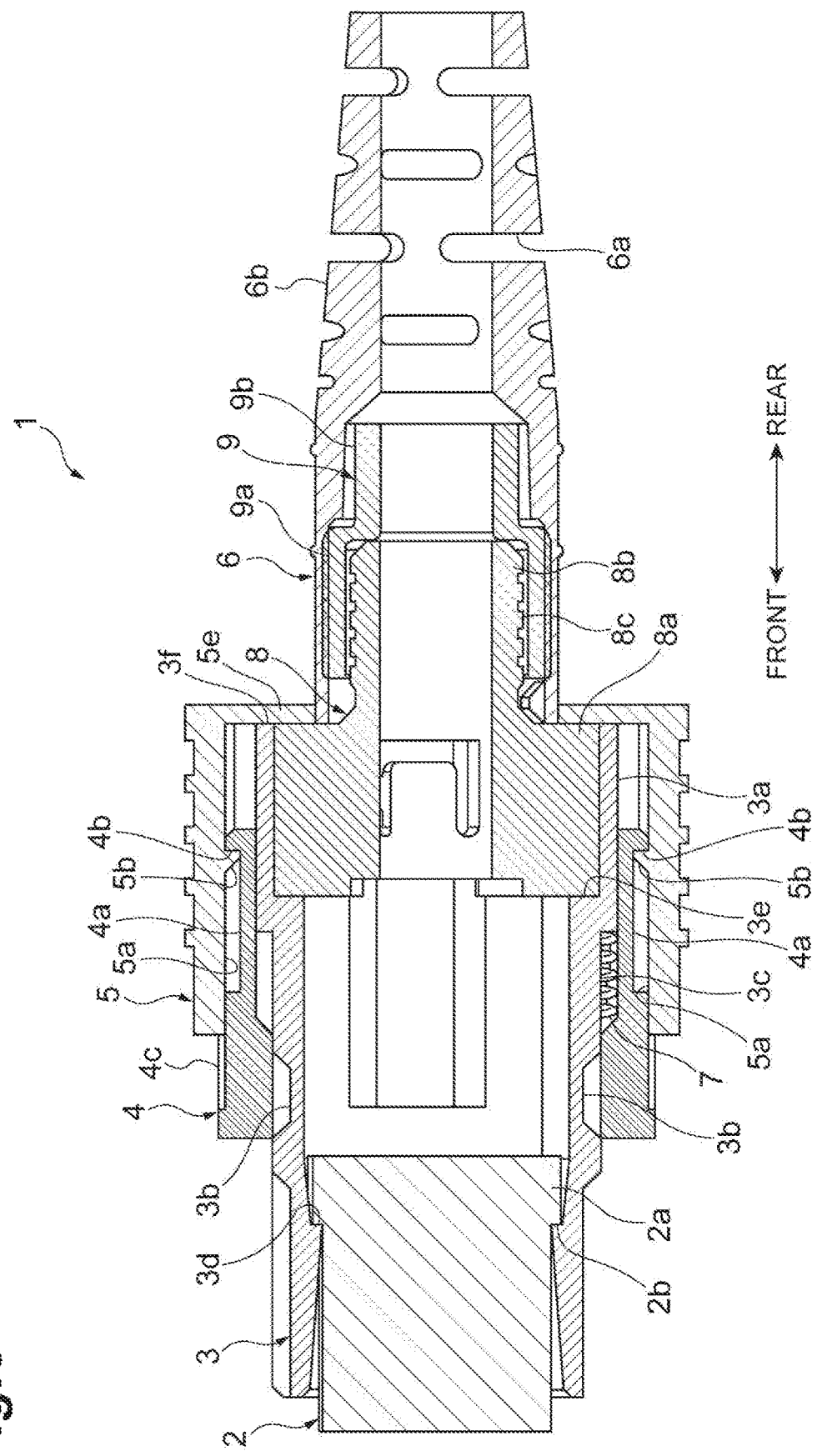
FIG. 3 is a longitudinal cross-sectional view showing the optical connector in FIG. 1.

FIG. 1 is a perspective view showing an optical connector 1 according to the present embodiment, FIG. 2 is a plan view showing the optical connector 1, and FIG. 3 is a longitudinal cross-sectional view of the optical connector 1. The optical connector 1 is an MPO connector. The optical connector 1 is a connector connected to an external optical adaptor.

As shown in FIG. 1 to FIG. 3, the optical connector 1 includes a rectangular ferrule 2, an inner housing 3, a first outer housing 4, a second outer housing 5 and a boot 6 as an appearance configuration. The ferrule 2 is positioned at one end of the optical connector 1. The inner housing 3 covers the ferrule 2, and the first outer housing 4 covers a part of the inner housing 3. The second outer housing 5 covers a part of the first outer housing 4. The boot 6 extends to the opposite side to the ferrule 2. Moreover, inside the optical connector 1, a coil spring 7, a rear housing 8, a caulking ring 9, a ferrule spring (not shown), and the like are provided.

In the below, for convenience of description, the "front", the "rear", the "top", the "bottom", the "left" and the "right" directions are defined to perform the description. The longitudinal direction of the optical connector 1 is set to a front-rear direction, specifically, the front is set to the orientation to which the ferrule 2 is seen from the boot 6, and the rear is set to the opposite direction thereto. Moreover, the longitudinal direction of the front face of the ferrule 2 is set to a right-left direction, and the short-side direction of the front face of the ferrule 2 is set to a top-bottom direction. These directions are merely for convenience of the description and do not limit the scope of the present invention.

The ferrule 2 has a box shape to include an expansion part 2a on its rear side. Inside the ferrule 2, a plurality of fiber holes extending in the front-rear direction is formed. Into each fiber hole, each of optical fibers constituting a fiber cord inserted from the rear of the boot 6 is inserted. A front face 2b of the expansion part 2a of the ferrule 2 is a contact face brought into contact with the inner housing 3. Moreover, the ferrule spring urging the ferrule 2 frontward is provided between the ferrule 2 and the rear housing 8.

The inner housing 3 has a stepped polygonal cylinder shape to include an expansion part 3a on its rear side. A pair of engagement recesses (engagement parts) 3b in the right-left direction, and a groove 3c are provided on the outer surface of the inner housing 3. Latches of an external optical adaptor are engaged with the engagement recesses 3b. The groove 3c contains the coil spring 7 urging the first outer housing 4 frontward. The engagement recesses 3b are provided on the surface of the inner housing 3. For example, the engagement recesses 3b are formed to be trapezoidal on the outer surface of the inner housing 3. By the latches of the optical adaptor fitting to the individual engagement recesses 3b, the optical connector 1 is engaged with the optical adaptor in the front-rear direction, and the optical connector 1 is attached to the optical adaptor. Moreover, the groove 3c extends in the front-rear direction. The coil spring 7 being extendable and shrinkable in the front-rear direction is contained in the groove 3c.

Inside the inner housing 3, the ferrule 2 and the rear housing 8 are contained. The inner surface of the inner housing 3 has a stepped shape. A contact face 3d which the ferrule 2 is brought into contact with, and a contact face 3e which the front end face of the rear housing 8 is brought into contact with are provided inside the inner housing 3. The front face 2b of the expansion part 2a of the ferrule 2 urged frontward by the ferrule spring is brought into contact with the contact face 3d.

The first outer housing 4 is attached freely movably in the front-rear direction outside the inner housing 3. The first outer housing 4 exhibits a cylindrical shape, and a cross section of the first outer housing 4 has a curved shape in which the short sides of the rectangle expand outward.

On an outer surface 4c of the first outer housing 4, slits 4a which the second outer housing 5 engages with are provided. The slits 4a extend to have a predetermined length in the front-rear direction. The first outer housing 4 includes, for example, a pair of slits 4a with symmetry in the right-left direction. Contact parts 4b brought into contact with the second outer housing 5 are provided at the rear ends of each of the slits 4a of the first outer housing 4. The contact parts 4b constitute the rear end faces of the slits 4a.

The second outer housing 5 covers a part of the rear side of the first outer housing 4 and is freely movable in the front-rear direction relative to the first outer housing 4. The second outer housing 5 is separate from the first outer housing 4. The second outer housing 5 exhibits a cylindrical shape. A cross section of the second outer housing 5 has a curved shape in which the short sides of the rectangle expand outward.

In the second outer housing 5, the rear housing 8 is contained. Claws 5b engaging with the slits 4a of the first outer housing 4 are formed on an inner surface 5a of the second outer housing 5. The claws 5b protrude inward of the second outer housing 5 from the inner surface Sa of the second outer housing 5. The second outer housing 5 includes, for example, a pair of claws 5b with symmetry in the right-left direction.

A protruding part Se which a rear end 3f of the inner housing 3 is brought into contact with from the front is provided at the rear end of the second outer housing 5. At the rear end of the second outer housing 5, the protruding part Se protrudes inward of the second outer housing 5. By moving the second outer housing 5 frontward and by the front face of the protruding part Se coming into contact with the rear end 3f of the inner housing 3 from the rear, both the second outer housing 5 and the inner housing 3 move frontward.

The rear housing 8 includes a cylindrical insertion part 8a inserted into the rear side of the inner housing 3, and a cylindrical part 8b engaged with the caulking ring 9 on the rear side of the insertion part 8a. The insertion part 8a has a shape expanded at the front end of the cylindrical part 8b. The rear housing 8 is engaged with the inner housing 3 in the state where the front end of the insertion part 8a is in contact with the contact face 3e of the inner housing 3. A convex and concave part 8c is formed on the outer circumferential surface of the cylindrical part 8b of the rear housing 8.

The caulking ring 9 exhibits a stepped cylindrical shape in which its front side is expanded in diameter. The caulking ring 9 is expanded in diameter into a stepped shape in such a way that the inner diameter meets the outer diameter as going from the rear to the front. The caulking ring 9 includes a large diameter part 9a positioned on its front side, and a small diameter part 9b positioned on the rear side of the large diameter part 9a. The caulking ring 9 engages with the rear housing 8 and is fixed thereto, tensile strength fibers, a covering and the like which constitute an optical fiber cord being pinched between the outer circumferential surface of the cylindrical part 8b and the inner circumferential surface of the caulking ring 9. Moreover, optical fibers which constitute the optical fiber cord are held inside the caulking ring 9.

The boot 6 exhibits a cylindrical shape extending in the front-rear direction. The boot 6 is attached to the caulking ring 9 in the state of containing the cylindrical part 8b of the rear housing 8 and the caulking ring 9. The boot 6 protects the optical fiber cord such that a drastic bend does not arise on the optical fiber cord. The front end of the boot 6 is in contact with the rear end of the insertion part 8a of the rear housing 8, and the boot 6 extends rearward from this contact portion. Rearward of the portion in which the boot 6 contains the caulking ring 9, a diameter reducing part 6b which is reduced in diameter as going to the rear is provided. A plurality of through holes 6a which have long hole shapes extending in the circumferential direction of the boot 6 are formed in the diameter reducing part 6b.

Now, for example, assuming the first outer housing 4 and the second outer housing 5 to be one integrated outer housing as in conventional ones, an optical connector would be attached to an external optical adaptor by pushing a boot frontward, and the optical connector would be detached from the optical adaptor by moving the outer housing rearward. Namely, there has been room for improvement in operability since the place of holding in attachment and the place of holding in detachment are different from each other, the boot being held for attachment in attaching the optical connector to the optical adaptor, the outer housing being held for detachment in detaching the optical connector from the optical adaptor. On the contrary, for the optical connector 1 according to the present embodiment, its operability is improved in an attachment operation and a detachment operation to/from the optical adaptor. Operations in attaching and detaching the optical connector 1 to/from the optical adaptor are described below.

First, an operation of attaching the optical connector 1 to the optical adaptor is described. In the state shown in FIG. 1 to FIG. 3, the operation of attaching the optical connector 1 to the optical adaptor is performed by pushing the second outer housing 5 frontward. When pushing the second outer housing 5 frontward, the front face of the protruding part 5e of the second outer housing 5 presses the rear end 3f of the inner housing 3, and the inner housing 3 moves frontward along with the second outer housing 5.

When the second outer housing 5 moves frontward along with the inner housing 3, the first outer housing 4 does not move frontward since the first outer housing 4 is restricted from moving frontward by the latches of the optical adaptor. Namely, when the second outer housing 5 moves frontward along with the inner housing 3, the first outer housing 4 relatively moves rearward.

Figure 4:
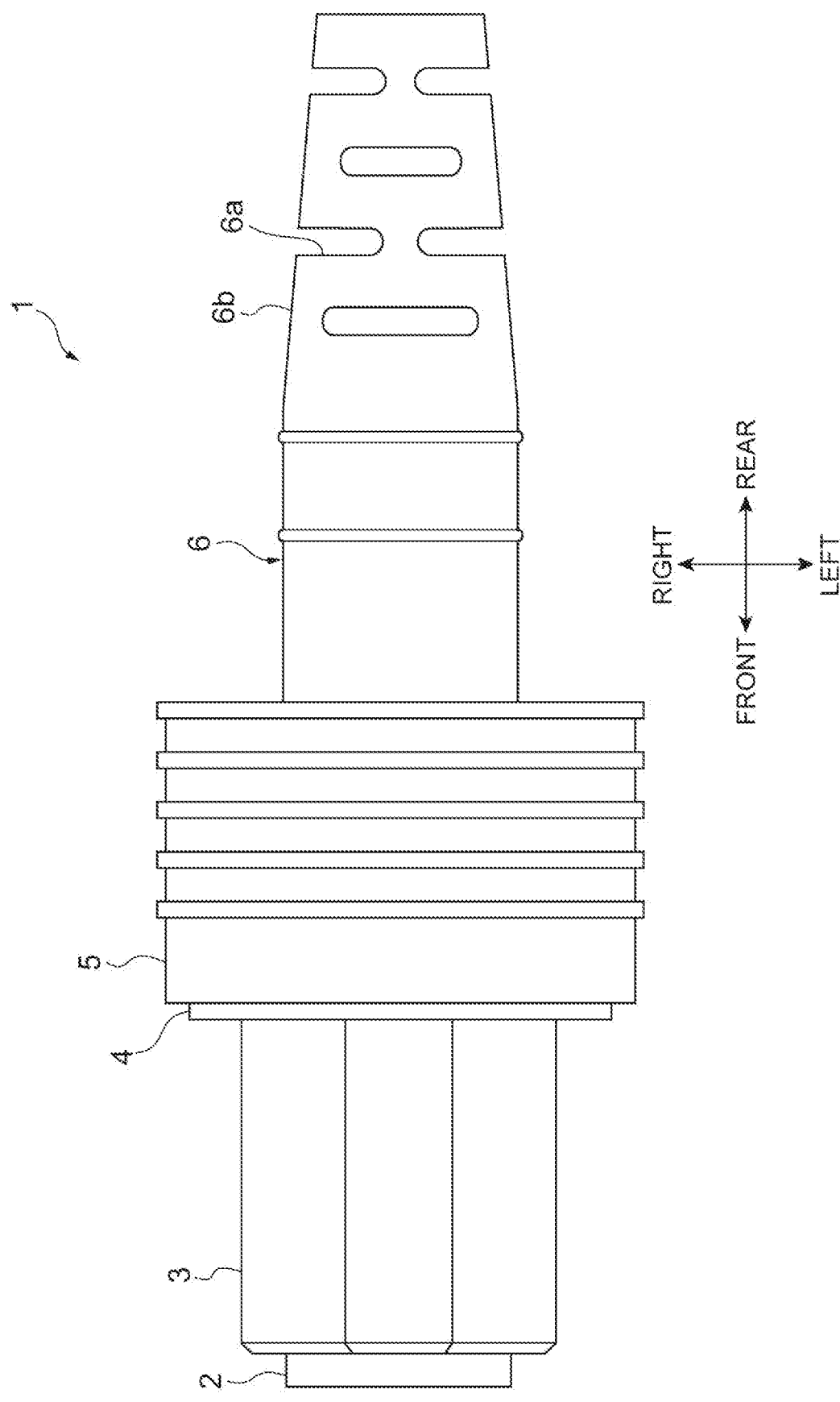
FIG. 4 is a plan view showing a state of inserting the optical connector in FIG. 1 into an optical adaptor.
Figure 5:
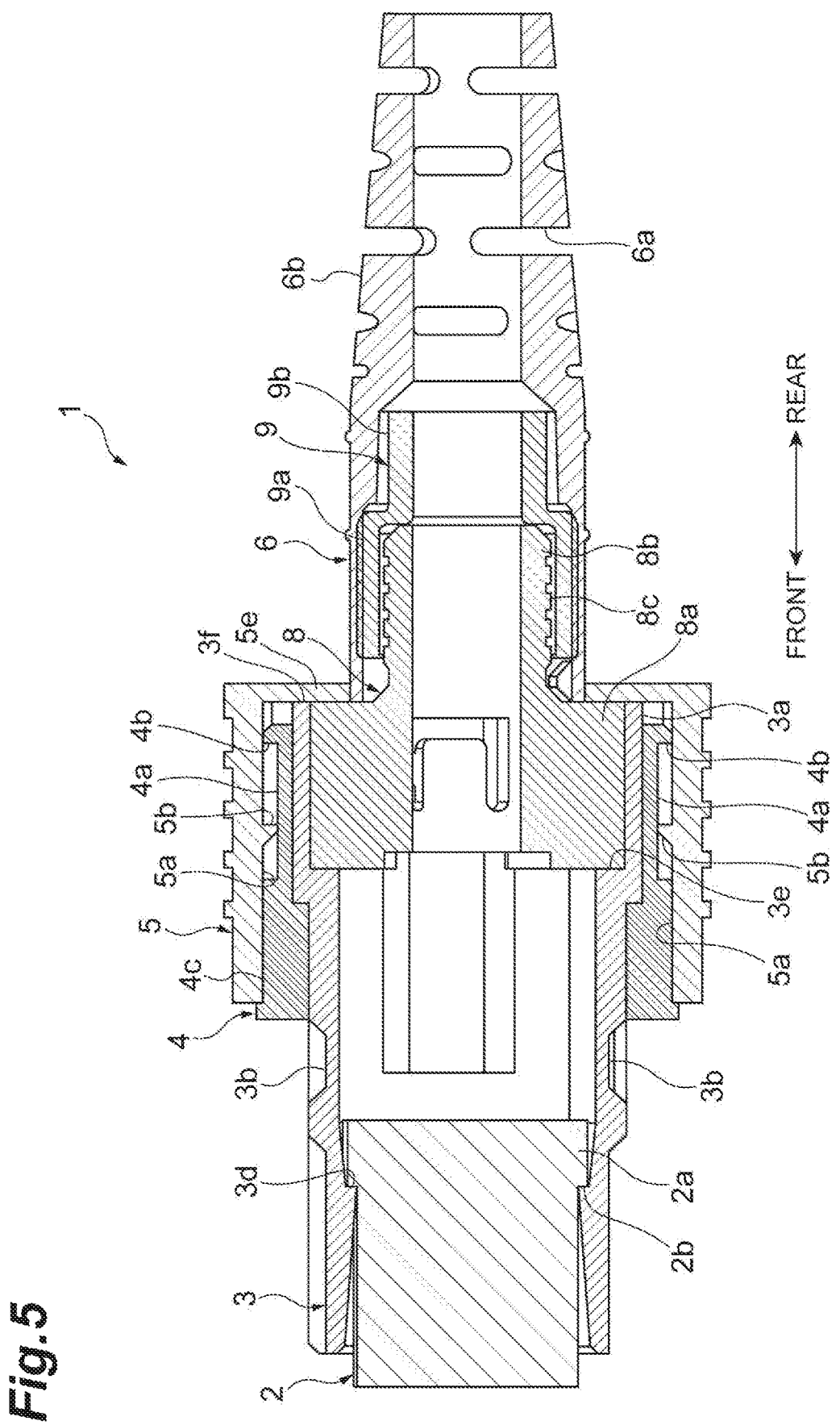
FIG. 5 is a longitudinal cross-sectional view showing the optical connector in FIG. 4.

When the second outer housing 5 moves frontward along with the inner housing 3 as above, as shown in FIG. 4 and FIG. 5, in the slits 4a of the first outer housing 4, the claws 5b of the second outer housing 5 move frontward. In this stage, since the inner housing 3 and the second outer housing 5 move frontward relative to the first outer housing 4, the engagement recesses 3b start to be exposed.

Then, when pushing the second outer housing 5 frontward, the inner housing 3 is also pushed frontward, and the latches of the optical adaptor engage with the engagement recesses 3b of the inner housing 3. After the engagement of the latches is completed, the first outer housing 4 urged frontward by the coil spring 7 contained in the groove 3c on the outer circumference of the inner housing 3 moves frontward to cover the latches of the optical adaptor and the engagement recesses 3b which are engaged with each other. Thereby, the attachment of the optical connector 1 to the optical adaptor is completed.

Next, an operation of detaching the optical connector 1 from the optical adaptor is described. The operation of detaching the optical connector 1 from the optical adaptor is performed by pulling the second outer housing 5 rearward. When pulling the second outer housing 5 rearward, the claws 5b of the second outer housing 5 press the contact parts 4b of the first outer housing 4, and after that, the first outer housing 4 moves rearward along with the second outer housing 5.

Figure 6:
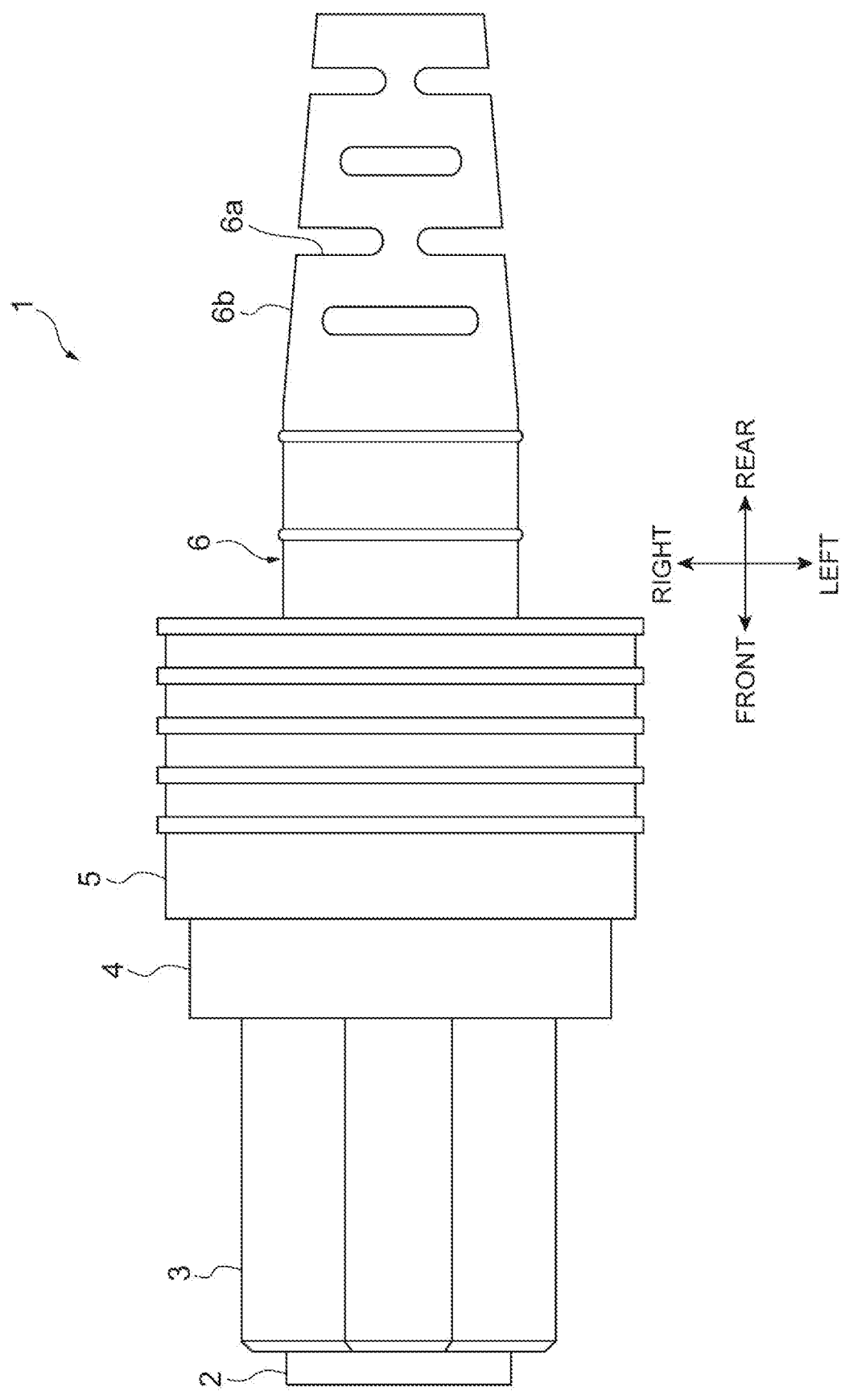
FIG. 6 is a plan view showing a state of pulling off the optical connector in FIG. 1 from the optical adaptor.
Figure 7:
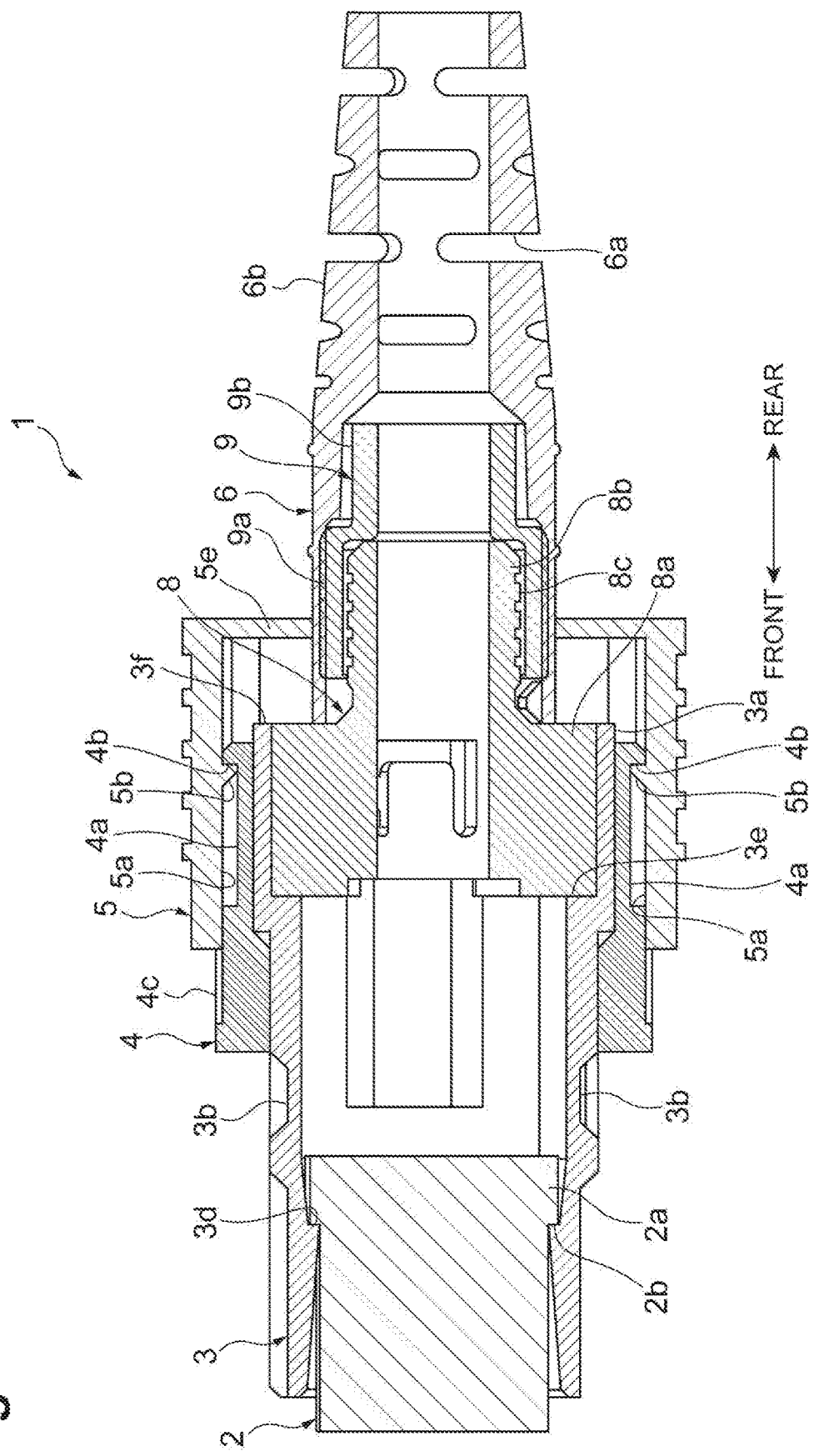
FIG. 7 is a longitudinal cross-sectional view showing the optical connector in FIG. 6.

When the second outer housing 5 moves rearward along with the first outer housing 4 as above, the inner housing 3 does not move rearward. Accordingly, when the second outer housing 5 moves rearward along with the first outer housing 4, as shown in FIG. 6 and FIG. 7, the engagement recesses 3b of the inner housing 3 are exposed. Then, when further pulling the second outer housing 5 rearward, the latches of the optical adaptor with respect to the engagement recesses 3b are released. When further pulling the second outer housing 5 rearward, the inner housing 3 is pulled along with the first outer housing 4, and thereby, the optical connector 1 can be pulled off from the optical adaptor.

As described above, in the optical connector 1, the first outer housing 4 and the second outer housing 5 are separate from each other, and the second outer housing 5 is freely movable in the front-rear direction relative to the first outer housing 4. Accordingly, when the second outer housing 5 moves frontward, since both the second outer housing 5 and the inner housing 3 move frontward and the engagement recesses 3b are exposed, the latches of the optical adaptor can be engaged with the engagement recesses 3b.

Moreover, when the second outer housing 5 moves rearward, both the second outer housing 5 and the first outer housing 4 move rearward, and the engagement recesses 3b are exposed. Therefore, by releasing the engagement with the optical adaptor at the engagement recesses 3b, the optical connector 1 can be detached from the optical adaptor. In this way, since the optical connector 1 can be attached and detached to/from the optical adaptor simply by moving the second outer housing 5 in the front-rear direction, its operability in attachment and detachment can be improved.

Moreover, since at least part of the first outer housing 4 is covered by the second outer housing 5, the whole length of the first outer housing 4 and the second outer housing 5 in the front-rear direction can be reduced. Accordingly, realizing shortening of the optical connector 1 can be achieved.

For the optical connector 1, since bending stress and tensile stress exerted particularly on these portions when inserting and pulling-off the optical connector 1 and during attachment thereof can be reduced by realizing the shortening, costs of materials and the like can also be reduced. As the material of the inner housing 3 and the rear housing 8, other than PEI (polyetherimide) which has been generally used, for example, PBT (polybutylene terephthalate) or PPS (polyphenylene sulfide) which costs less and is relatively lower in strength can be used. Notably, as the material of the first outer housing 4 and the second outer housing 5, the same one as that of the inner housing or the rear housing 8 can be used.

Moreover, in the optical connector 1, the slits 4a are provided on the outer surface 4c of the first outer housing 4, the claws 5b are provided on the inner surface 5a of the second outer housing 5, and the second outer housing 5 is freely movable relative to the first outer housing 4 in the state where the claws 5b engage with the slits 4a. Therefore, since the second outer housing 5 moves in the state where the claws 5b engage with the slits 4a, the movement of the second outer housing 5 can be stabilized.

As above, while an embodiment of the present invention has been described, the present invention is not limited to the aforementioned embodiment but various modifications thereof can occur without departing from the spirit of the present invention. For example, it can also be widely applied to various multicore and single-core optical connectors. Moreover, the optical connector 1 may be, for example, a so-called field-assembled optical connector which is attached to an optical fiber cord on site.

Moreover, in the aforementioned embodiment, the pair of slits 4a are provided on the outer surface 4c of the first outer housing 4, and the pair of claws 5b are provided on the inner surface 5a of the second outer housing 5. Nevertheless, the number, arrangement and shape of slit(s) 4a can be properly modified. The number, arrangement and shape of claw(s) 5b of the second outer housing 5 can also be properly modified. Furthermore, in place of the first outer housing 4 including the slit(s) 4a and the second outer housing 5 including the claw(s) 5b, a first outer housing including a claw and a second outer housing including a slit may be used.

REFERENCE SIGNS LIST

1 Optical connector
2 Ferrule
2a Expansion part
2b Front face
3 Inner housing
3a Expansion part
3b Engagement recess (engagement part)
3c Groove
3d, 3e Contact face
3f Rear end
4 First outer housing
4a Slit
4b Contact part
5 Second outer housing
5a Inner surface
5b Claw
5e Protruding part
6 Boot
6a Through hole
6b Diameter reducing part
7 Coil spring
8 Rear housing
8a Insertion part
8b Cylindrical part
8c Convex and concave part
9 Caulking ring
9a Large diameter part
9b Small diameter part

The invention claimed is:

1. An optical connector connected to an optical adaptor along a predetermined connecting direction, the optical connector comprising:

an inner housing including an engagement part for engaging with the optical adaptor on its surface;

a boot connected to one side of the inner housing in the connecting direction;

a first outer housing covering the engagement part; and a second outer housing covering at least part of the first outer housing in the connecting direction and provided freely movably in the connecting direction relative to the first outer housing, the second outer housing surrounding an entire periphery of the first outer housing at a cross-section perpendicular to the connecting direction, wherein when the second outer housing moves in a direction away from the hoot, the engagement part is exposed by the second outer housing and the inner housing moving relative to the first outer housing, and when the second outer housing moves in a direction toward to the boot, the engagement part is exposed by the second outer housing and the first outer housing moving relative to the inner housing.

2. The optical connector according to claim 1, wherein one of a slit and a claw is provided on an outer surface of the first outer housing, the other of the slit and the claw is provided on an inner surface of the second outer housing, and the second outer housing is freely movable relative to the first outer housing in a state where the claw engages with the slit.

* * * * *